US007449524B2

(12) United States Patent
Park et al.

(10) Patent No.: US 7,449,524 B2
(45) Date of Patent: *Nov. 11, 2008

(54) DYNAMIC VULCANIZATION WITH FLUOROCARBON PROCESSING AIDS

(75) Inventors: Edward Hosung Park, Saline, MI (US); Francis Joseph Walker, Tecumseh, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 344 days.

This patent is subject to a terminal disclaimer.

(21) Appl. No.: 11/029,770

(22) Filed: Jan. 5, 2005

(65) Prior Publication Data

US 2006/0148954 A1 Jul. 6, 2006

(51) Int. Cl.
*C08L 27/12* (2006.01)
(52) U.S. Cl. .................. 525/199; 524/500; 524/544; 524/545; 524/546; 525/200; 525/276
(58) Field of Classification Search ................ 525/199, 525/200, 276; 524/544, 545, 546
See application file for complete search history.

(56) References Cited

U.S. PATENT DOCUMENTS

| | | | |
|---|---|---|---|
| 2,476,884 A | 7/1949 | Maynard | |
| 3,037,954 A | 6/1962 | Gessler et al. | |
| 3,538,028 A | 11/1970 | Morgan | |
| 3,580,889 A | 5/1971 | Barney et al. | ............... 525/132 |
| 3,787,341 A | 1/1974 | Aron | |
| 3,853,811 A | 12/1974 | Chandrasekaran | |
| 3,884,877 A | 5/1975 | Kolb | |
| 4,035,565 A | 7/1977 | Apotheker et al. | |
| 4,094,949 A | 6/1978 | Yokokawa et al. | |
| 4,287,320 A | 9/1981 | Kolb | |
| 4,311,628 A | 1/1982 | Abdou-Sabet et al. | |
| 4,328,140 A | 5/1982 | Singletary et al. | |
| 4,419,499 A | 12/1983 | Coran et al. | |
| 4,450,263 A | 5/1984 | West | |
| 4,451,542 A | 5/1984 | Ishida et al. | |
| 4,491,536 A | 1/1985 | Tomoda | |
| 4,530,881 A | 7/1985 | Santoso et al. | |
| 4,572,516 A | 2/1986 | Symons et al. | |
| 4,624,978 A | 11/1986 | Frayer | |
| 4,656,228 A | 4/1987 | Richter et al. | |
| 4,696,976 A | 9/1987 | Ellerbe, III et al. | |
| 4,696,989 A | 9/1987 | Oka et al. | |
| 4,696,998 A | 9/1987 | Brunelle et al. | ............. 528/272 |
| 4,713,418 A | 12/1987 | Logothetis et al. | |
| 4,787,991 A | 11/1988 | Morozumi et al. | |
| 5,006,594 A * | 4/1991 | Rees | ........................... 524/520 |
| 5,095,072 A | 3/1992 | Kobayashi et al. | |
| 5,108,780 A | 4/1992 | Pitt et al. | ................... 427/538 |
| 5,206,293 A * | 4/1993 | Sakai et al. | ................. 525/194 |
| 5,219,931 A | 6/1993 | Siol et al. | |
| 5,331,040 A | 7/1994 | Lee | |
| 5,354,811 A | 10/1994 | Kamiya et al. | |
| 5,371,143 A | 12/1994 | Novak et al. | |
| 5,384,374 A | 1/1995 | Guerra et al. | |
| 5,397,832 A | 3/1995 | Ellul | |
| 5,459,202 A * | 10/1995 | Martinez et al. | ............ 525/200 |
| 5,548,028 A | 8/1996 | Tabb | |
| 5,585,152 A | 12/1996 | Tamura et al. | |
| 5,589,526 A | 12/1996 | Sienel et al. | |
| 5,639,810 A | 6/1997 | Smith, III et al. | ........... 524/269 |
| 5,700,866 A | 12/1997 | Tabb | |
| 5,723,544 A | 3/1998 | Lee | |
| 5,792,348 A | 8/1998 | Eisinga | |
| 5,910,544 A | 6/1999 | Ozawa et al. | |
| 5,962,589 A | 10/1999 | Matsumoto et al. | |
| 6,048,939 A | 4/2000 | Priester | ...................... 525/198 |
| 6,054,537 A | 4/2000 | Shimizu et al. | |
| 6,066,697 A | 5/2000 | Coran et al. | |
| 6,079,465 A | 6/2000 | Takeyama et al. | ........... 152/510 |
| 6,114,441 A | 9/2000 | Spohn et al. | |

(Continued)

FOREIGN PATENT DOCUMENTS

CA          2475263          9/2003

(Continued)

OTHER PUBLICATIONS

"Polyurethanes" Encyclopedia of Polymer Science & Engineering, vol. 13, Second Edition (pp. 274-278).

(Continued)

*Primary Examiner*—Peter D. Mulcahy
*Assistant Examiner*—Henry Hu
(74) *Attorney, Agent, or Firm*—Ronald W. Wangerow; Harness, Dickey & Pierce, P.L.C.

(57) ABSTRACT

A curable fluorocarbon elastomer is dynamically cured in the presence of a major amount of a non-curing thermoplastic material and a minor amount of a second fluorocarbon elastomer that does not cure under the dynamic vulcanization conditions. The non-curing elastomer is preferably present at from 1 to 20 parts based on 100 parts of the curing fluorocarbon elastomer. Processable rubber compositions comprise a continuous phase of a thermoplastic material, particles of a cured fluorocarbon elastomer dispersed in the continuous phase, and an uncured fluorocarbon elastomer at a level of 10 parts or less per 100 parts of the cured fluorocarbon elastomer. Shaped articles such as gaskets and seals are produced by thermoplastic processing of the processable rubber compositions.

26 Claims, No Drawings

U.S. PATENT DOCUMENTS

| | | | |
|---|---|---|---|
| 6,147,158 | A | 11/2000 | Chmielewski |
| 6,162,385 | A | 12/2000 | Grosse-Puppendahl et al. |
| 6,310,141 | B1 | 10/2001 | Chen et al. |
| 6,312,639 | B1 | 11/2001 | Ertle et al. |
| 6,407,174 | B1 | 6/2002 | Ouhadi |
| 6,410,630 | B1 | 6/2002 | Hoover et al. |
| 6,429,249 | B1 | 8/2002 | Chen et al. |
| 6,437,030 | B1 | 8/2002 | Coran et al. |
| 6,500,374 | B1 | 12/2002 | Akioka et al. |
| 6,624,251 | B1 * | 9/2003 | Chmielewski ............... 525/199 |
| 6,649,704 | B2 | 11/2003 | Brewer et al. |
| 6,656,831 | B1 | 12/2003 | Lee et al. |
| 6,663,966 | B2 | 12/2003 | Mhetar |
| 6,872,325 | B2 | 3/2005 | Bandyopadhyay et al. |
| 7,022,769 | B2 | 4/2006 | Park |
| 7,029,750 | B2 | 4/2006 | Takei et al. .................... 399/70 |
| 7,098,270 | B2 | 8/2006 | Hochgesang et al. |
| 7,135,527 | B2 * | 11/2006 | Park ........................... 525/199 |
| 2002/0099142 | A1 | 7/2002 | Faulkner |
| 2002/0113066 | A1 | 8/2002 | Stark et al. |
| 2002/0122928 | A1 | 9/2002 | Botrie et al. |
| 2002/0198320 | A1 | 12/2002 | Chmielewski et al. ....... 525/100 |
| 2003/0026995 | A1 | 2/2003 | Duchesne et al. |
| 2003/0138655 | A1 | 7/2003 | Watanabe et al. |
| 2003/0144409 | A1 | 7/2003 | Kassa et al. |
| 2003/0166780 | A1 | 9/2003 | Shimizu et al. |
| 2004/0183702 | A1 | 9/2004 | Nachtigal et al. |
| 2004/0260023 | A1 | 12/2004 | Park et al. |
| 2005/0014900 | A1 * | 1/2005 | Park ........................... 525/191 |
| 2005/0148183 | A1 | 7/2005 | Shiro et al. |
| 2005/0155690 | A1 | 7/2005 | Park |
| 2005/0165168 | A1 | 7/2005 | Park |
| 2005/0167928 | A1 | 8/2005 | Park et al. |
| 2005/0171282 | A1 | 8/2005 | Park |
| 2005/0222337 | A1 * | 10/2005 | Park ........................... 525/199 |
| 2005/0272872 | A1 | 12/2005 | Park |
| 2005/0275565 | A1 | 12/2005 | Nachtigal et al. |
| 2005/0281973 | A1 | 12/2005 | Park |
| 2005/0288434 | A1 | 12/2005 | Sugiura et al. |
| 2006/0003127 | A1 | 1/2006 | Park et al. |
| 2006/0004126 | A1 | 1/2006 | Park et al. |
| 2006/0004142 | A1 | 1/2006 | Park et al. |
| 2006/0124889 | A1 | 6/2006 | Park et al. |
| 2006/0142467 | A1 * | 6/2006 | Park ........................... 524/495 |
| 2006/0142491 | A1 | 6/2006 | Park |
| 2006/0142492 | A1 | 6/2006 | Park |
| 2006/0290070 | A1 | 12/2006 | Park |
| 2007/0004862 | A1 | 1/2007 | Park et al. |
| 2007/0004865 | A1 | 1/2007 | Park |
| 2007/0044906 | A1 | 3/2007 | Park |
| 2007/0055020 | A1 | 3/2007 | Park |

FOREIGN PATENT DOCUMENTS

| | | |
|---|---|---|
| CA | 2513789 | 8/2004 |
| EP | 0132583 | 2/1985 |
| EP | 0148719 | 7/1985 |
| EP | 0239707 | 10/1987 |
| EP | 0 168 020 B1 | 10/1989 |
| EP | 422960 A2 * | 4/1991 |
| EP | 0432911 | 6/1991 |
| EP | 432911 A1 * | 6/1991 |
| EP | 439734 B1 * | 8/1991 |
| EP | 0254307 | 12/1991 |
| EP | 0304843 | 3/1993 |
| EP | 0566313 | 10/1993 |
| EP | 0681113 | 11/1995 |
| EP | 0714944 | 6/1996 |
| EP | 1209203 | 5/2002 |
| JP | 58-032655 | 2/1983 |
| JP | 62-011767 | 1/1987 |
| JP | 62-236841 | 10/1987 |
| JP | 05-156090 | 6/1993 |
| JP | 05-186606 | 7/1993 |
| JP | 06-016949 | 1/1994 |
| JP | 11-140269 | 5/1999 |
| JP | 2000-079928 | 3/2000 |
| JP | 2001-336679 | 12/2001 |
| WO | WO-96/00761 * | 1/1996 |
| WO | WO 00/11073 | 3/2000 |
| WO | WO 01/48077 | 7/2001 |
| WO | WO 01/98405 | 12/2001 |
| WO | WO-01/98405 A2 * | 12/2001 |

OTHER PUBLICATIONS

Webpage: "Dyneon™ Fluorothermoplastics" Accessed from 3M Manufacturing and Industrial and Downloaded May 8, 2003. (2 pages).

Material Safety Data Sheet "DuPont™ TPV 60A01 and 80A01", C.S. Wong, (Sep. 18, 2001). (9 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Schmiegel, Walter W. "A Review of Recent Progress in the Design and Reactions of Base-Resistant Fluoroelastomers." IRC, Jul. 2003.

"AFLAS™ The Fluoroelastomer", Asahi Glass Company, Product Information, pp. 1-8, Apr. 11, 2003.

"Fluorine-Containing Polymers", Encyclopedia of Polymer Science & Engineering, vol. 7, 1987, Second Edition, pp. 256-267.

"Viton® Fluoroelasotmer, A Product of DuPont Dow Elastomers", Technical Information, DuPont Dow Elastomers, Copyright 1988.

Michael J. Moore, "Silanes as Rubber-to-Metal Bonding Agents", 160th Meeting of the Rubber Division, American Chemical Society, Cleveland Ohio, Paper No. 105, pp. 1-17, 2001.

"Polyurethanes" Encyclopedia of Polymer Science & Engineering, vol. 13, Second Edition (Date Unknown). (pp. 274-278).

Viton® Fluoroelastomer: Viton Extreme ETP-600S Technical Information (Formerly designated VTR-8710), DuPont Dow Elastomers (Date Unknown). (6 pages).

DuPont "Grades for Customer Evaluation"—TPV 60A and TPV 80A. (3 pages), year 2003.

Sasol: Sasol Olefins and Surfactants available at www.sasoltechdata.com. (20 pages), year 2003.

* cited by examiner

DYNAMIC VULCANIZATION WITH FLUOROCARBON PROCESSING AIDS

INTRODUCTION

The invention relates to thermal processable thermoplastic elastomer compositions. In particular, the invention relates to methods for making the composition by dynamic vulcanization of a fluorocarbon elastomer in the presence of low levels of a second non-curing elastomer.

Shaped articles, such as gaskets, hoses, seals, and the like, made from cured fluorocarbon rubbers have a desirable combination of physical properties that make them suitable for use in a variety of industrial and other applications. For example, their high temperature stability and chemical resistance makes them suitable for use in automotive and other applications that are exposed to high temperatures and/or corrosive chemical environment.

Fluorocarbon rubbers are processed with rubber molding techniques, resulting in high equipment and energy costs as well as relative slow turnaround. In addition, scrap produced in the manufacture process can generally not be recycled and must be disposed of, such as by land filling.

Recently, thermoprocessable compositions containing fluorocarbon elastomers have been described. The thermoprocessable compositions may be processed by thermoplastic means such as injection molding, compression molding and the like. The compositions often require the presence of so-called processing aids in their manufacture. The processing aids provide the compositions with low viscosity, low friction, and other desirable properties that increase the efficiency of manufacture of the articles.

Processing aids should withstand high temperatures and be compatible with the fluorocarbon elastomers present in the compositions. A commonly used processing aid is based on a perfluoropolyether. It would be desirable to find and develop additional compatible processing aids to withstand the high temperatures of the thermoplastic processes.

SUMMARY

Shaped articles such as hoses, seals, and gaskets are made by thermoplastic processing of dynamic vulcanizates containing cured fluorocarbon elastomers and processing aids comprising uncured fluorocarbon elastomer polymers. Processing aids of the invention are compatible with the cured elastomer and thermoplastic polymer components of the dynamic vulcanizate and provide plasticizing and friction reduction, among other properties, during subsequent thermoplastic processing. If the fluorocarbon elastomer of the dynamic vulcanizate is peroxide cured, the processing aid is a fluorocarbon elastomer polymer that is not cured by peroxide under the conditions of the dynamic vulcanization. If the fluorocarbon elastomer is phenol cured, the processing aid is a fluorocarbon elastomer polymer that is not cured by phenol under the vulcanization conditions.

In various aspects, the invention relates to the dynamic vulcanization of a curable fluorocarbon elastomer in the presence of a major amount of a non-curing thermoplastic material and a minor amount of an elastomer that does not cure under the dynamic vulcanization conditions. The non-curing elastomer is preferably present at from 1 to 20 parts based on 100 parts of the curing fluorocarbon elastomer.

The invention also provides processable rubber compositions comprising a continuous phase of a thermoplastic material, particles of a cured fluorocarbon elastomer dispersed in the continuous phase, and an uncured fluorocarbon elastomer at a level of 10 parts or less per 100 parts of the cured fluorocarbon elastomer. Shaped articles are produced by thermoplastic processing of the processable rubber compositions of the invention. In various embodiments, the shaped articles comprise a thermoplastically processed dynamic vulcanizate of a curable fluorocarbon elastomer, a thermoplastic polymeric material, and an un-curable fluorocarbon elastomer, where the curable fluorocarbon elastomer cures under the dynamic vulcanization conditions and the un-curable elastomer cures incompletely or not at all under the conditions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

The terms "elastomeric material", "elastomer" and the like refer to chemical compositions that possess, or can be modified (i.e. cured or crosslinked) to possess elastomeric properties. According to context, the terms refer to an uncured or partially cured material, in which elastomeric properties are not fully developed, or to a cured rubber-like material, with fully developed elastomeric properties. At some points in the specification, the terms are used with adjectives such as "cured", "partially cured", or "uncured" for clarity.

The terms "curing agent", "curative", "curative agent," and the like are used interchangeably to designate the chemical compound or composition that reacts with the (uncured) elastomer to form a cured elastomer and to develop the elastomeric properties of the cured product. According to context it is used to refer to a formal curing initiator (e.g. a radical initiator such as a peroxide) as well as a crosslinking agent that may be used in conjunction with the initiator (e.g. triallylisocyanurate). At some points, the term "curing system" or the like is used to refer to a combination of initiator and crosslinker and optional additional components used in the curing. It is to be understood that often the curing system is provided by an elastomer supplier (and may be incorporated into the elastomer), and may be used according to the manufacturer's instructions.

In one embodiment, the invention provides a shaped article made of a thermoplastically processed dynamic vulcanizate. The dynamic vulcanizate is made from a curable fluorocarbon elastomer, a thermoplastic polymeric material, and an un-curable fluorocarbon elastomer. The curable and incurable fluorocarbon elastomers are so-called because during the dynamic vulcanization, the curable elastomer cures while the un-curable elastomer cures incompletely or not at all. In various embodiments, the uncurable elastomer is present at from 1 to 20 parts, preferably from 1 to 10 parts, based on 100 parts of the curable elastomer. In a preferred embodiment, the curable elastomer, the uncurable elastomer, and the thermoplastic polymeric material are all based on fluorocarbon polymers.

In another embodiment, the invention provides processable rubber compositions. The compositions contain a continuous phase of a thermoplastic polymeric material and particles of a cured fluorocarbon elastomer dispersed in the continuous phase. The processable rubber composition further contains an uncured fluorocarbon elastomer at a level of 10 parts or less per 100 parts of the cured fluorocarbon elastomer. In various embodiments, the thermoplastic polymeric material comprises a fluorocarbon thermoplastic polymer. The cured fluorocarbon elastomer particles are preferably present at 35% by weight or more based on the weight of the cured fluorocarbon elastomer and the thermoplastic material. In various embodiments, the cured fluorocarbon elastomer makes up 50% by weight or more of the total weight of the cured elastomer and thermoplastic material.

In another embodiment, the invention provides dynamic vulcanization processes for making the thermoprocessable polymeric compositions. A first fluorocarbon elastomer composition is dynamically vulcanized or cured in the presence of a thermoplastic polymeric material and in the further presence of a second fluorocarbon elastomer composition. The vulcanization or cure is carried out under conditions where the first fluorocarbon elastomer composition is fully cured and the second fluorocarbon elastomer composition is partially cured or not at all cured during the dynamic vulcanization process. In various embodiments, the second fluorocarbon elastomer is present at up to 10 parts based on 100 parts of the first fluorocarbon elastomer composition. In various embodiments, the thermoplastic polymeric material is a thermoplastic fluorocarbon polymer, and the first fluorocarbon elastomer is present at a level of 35% or greater by weight based on the total weight of the first fluorocarbon elastomer composition and the thermoplastic polymeric material.

In various embodiments, the dynamic vulcanization comprises peroxide curing or phenol curing of the first fluorocarbon elastomer composition. Thus in one embodiment, the first fluorocarbon elastomer composition contains a peroxide curable elastomer, a peroxide, and a crosslinking agent such as triallyl isocyanurate. Alternatively, the first fluorocarbon elastomer composition comprises an elastomer curable by phenol, a phenol crosslinking agent such as bisphenol A, and a crosslinking accelerator such as magnesium oxide and/or calcium hydroxide.

In one aspect, the process of the invention involves vulcanizing or curing under conditions where the rate of cure of the first fluorocarbon elastomer composition is two times or greater that of the rate of cure of the second fluorocarbon elastomer composition. In various preferred embodiments, the cure rate of the first elastomer composition is 5 times or greater, preferably 10 times or greater, and preferably 100 times or greater than the rate of cure of the second elastomer composition. In a preferred embodiment, the rate of cure of the first elastomer composition is so much greater than that of the second elastomer composition that the latter is considered to be essentially non-cured under the conditions.

In various embodiments, the process is carried out by forming a mixture containing a first fluorocarbon elastomer curable with peroxide, a peroxide compound, a peroxide crosslinking agent, a thermoplastic polymer composition, and a second fluorocarbon elastomer. The mixture is then dynamically cured by applying mechanical and thermal energy to the mixture. The curing is carried out under conditions at which the rate of cure of the first elastomer is at least twice the rate of cure of the second elastomer; preferably the cure rate of the first elastomer is at least 10 times, and more preferably at least 100 times that of the first elastomer. In various embodiments, at least a portion of the second elastomer remains uncured following the dynamic curing. In a preferred embodiment, the second elastomer is essentially uncured.

In various preferred embodiments, the first elastomer contains cure site monomers and the second elastomer contains no cure site monomers. The cure site monomers provide sites for rapid crosslinking by peroxide. Thus in a preferred embodiment, the second elastomer comprises a fluorocarbon elastomer that cures only very slowly if at all under peroxide crosslinking conditions. If the second fluorocarbon elastomer is curable with phenol or similar crosslinking agents, it is preferred to provide the second fluorocarbon elastomer without the presence of the polyol crosslinking agent or its polyol curing accelerators.

In an alternative embodiment, a process for making a thermoprocessable composition comprises forming a mixture containing a first fluorocarbon elastomer curable with a polyol, a polyol crosslinking agent, a polyol crosslinking accelerator, a thermoplastic polymeric composition, and a second fluorocarbon elastomer. The mixture is dynamically cured or vulcanized by applying mechanical and thermal energy to the mixture for times sufficient to cure the first elastomer. The curing or vulcanization is carried out under conditions where the rate of cure of the first fluorocarbon elastomer is at least twice that of the second fluorocarbon elastomer. In a preferred embodiment, the first elastomer comprises a polyol curable fluorocarbon elastomer such as a copolymer of vinylidene fluoride. At least a portion of the second elastomer remains uncured following the dynamic vulcanization of the mixture.

In various aspects, a feature of the invention is selecting a processing aid compatible with the dynamic vulcanizate and not cured under conditions of dynamic vulcanization and subsequent thermoplastic processing. If the dynamic vulcanizate undergoes a peroxide cure, the processing aid is selected as a fluorocarbon elastomer not cured by peroxide. Alternatively, if the processing aid is curable by peroxide, it is curable at a lower rate than the other elastomer. If the dynamic vulcanizate is phenol cured, the processing aid is preferably selected from fluorocarbon elastomers that are not phenol cured or, if they are phenol curable, are curable at a lower rate than the other elastomer. Desirably, the processing aid of the invention is present in the compositions at from 1 to 20, preferably about 1 to 10 parts based on 100 parts of the fluorocarbon elastomer that is cured during the dynamic vulcanization. In various places throughout the specification and claims, the processing aid is referred to as the second elastomer or second fluorocarbon elastomer, while the other elastomer that is cured during the dynamic vulcanization is referred to as the first elastomer or first fluorocarbon elastomer. The second elastomer is sometimes referred to as the "uncurable" elastomer, while the first elastomer is designated as "curable".

The presence of the processing aid (i.e. uncured second elastomer in the thermoprocessable compositions of the invention leads to several advantages. The melt viscosity of the compositions containing the processing aids tends to be lower. As a consequence, injection molding pressure is lowered resulting in energy savings. Shaped articles made form the composition also tend to have better physical integrity and physical properties, as well as fewer internal and surface defects.

In various embodiments, the first fluorocarbon elastomer or curable fluorocarbon elastomer is selected form the group consisting of peroxide curable elastomers and polyol or phenol curable elastomers. The first elastomer is first cured during dynamic vulcanizations under conditions of peroxide cure or phenol cure as described below. The second elastomer is chosen from among elastomeric components that do not cure under the conditions of dynamic vulcanization. Peroxide and polyol curing systems are well known in the art. A brief description of suitable fluorocarbon elastomers and crosslinking or curing systems follows.

Fluorocarbon elastomers are curable compositions based on fluorine-containing polymers. Various types of fluoroelastomers may be used as the first and second elastomers of the invention, or as the "curable" and "uncurable" elastomers. In various embodiments, the fluorocarbon elastomers are selected from fluorosilicone rubbers and fluorocarbon polymer rubbers. One classification of fluorocarbon polymer rubbers is given in ASTM-D 1418, "Standard practice for rubber and rubber latices-nomenclature". The designation FKM is given for fluoro-rubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68-69.5% by weight fluorine. Another FKM elastomer is chemically described as a terpolymer of tetrafluoroethylene, a fluorinated vinyl ether, and vinylidene fluoride. Such elastomers tend to have improved low temperature performance. They are available with 62-68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoro-propylene, ethylene, a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. In one aspect, they are based on fluorocarbon polymers that do not contain vinylidene fluoride as one of the constituent monomers. As a group, the FFKM fluoroelastomers tend to have superior fluid resistance. They were originally introduced by DuPont under the Kalreze® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

In various embodiments, fluorosilicone rubbers are used as the first curable elastomer in the methods and compositions of the invention. Fluorosilicone rubbers are available commercially from a number of suppliers including Shinetsu and Dow Corning. They are supplied in two parts, one containing a resin and the other containing hardening or crosslinking system. The fluorosilicone rubbers tend to cure even at room temperature; as a result, the hardener is not to be added to the dynamically curing system until the thermoplastic phase has been heated to a melt flowable temperature. At that point, the hardener is added and the cure continued until the fluorosilicone rubber is completely cured. Commercial embodiments include Sifel® from Shinetsu and Silastic® FL 65-2001 from Dow Corning.

Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr).

In various embodiments, the fluorocarbon elastomeric material comprises repeating units derived from 10-90 mole % tetrafluoroethylene, 10-90 mole % $C_{2-4}$ olefin, and up to 30 mole % of one or more additional fluorine-containing monomers. Preferably, the repeating units are derived from 25-90 mole % tetrafluoroethylene and 10-75 mole % $C_{2-4}$ olefin. In another preferred embodiment, the repeating units are derived from 45-65 mole % tetrafluoroethylene and 20-55 mole % $C_{2-4}$ olefin.

In various embodiments, the molar ratio of tetrafluoroethylene units to $C_{2-4}$ olefin repeating units is from 60:40 to 40:60. In another embodiment, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene are commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoro-propylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from DuPont under the Viton® ETP trade name.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene.

Chemically, in this embodiment the elastomeric material is made of copolymers of VDF and HFP, or of terpolymers of VDF, HFP, and tetrafluoroethylene (TFE), with optional cure site monomers. In preferred embodiments, they contain about 66 to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing precompounds.

In another embodiment, the elastomers can be described chemically as copolymers of TFE and PFVE, optionally as a terpolymer with VDF. The elastomer may further contain repeating units derived from cure site monomers.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

The copolymers may also contain relatively minor amounts of cure site monomers (CSM), discussed further below. The presence of cure site monomers in an elastomer tends to increase the rate at which the elastomer can be cured by peroxides. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. In various embodiments, the elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, DuPont, and Daikin.

The cure site monomers are preferably selected from the group consisting of brominated, chlorinated, and iodinated olefins; brominated, chlorinated, and iodinated unsaturated ethers; and non-conjugated dienes. Halogenated cure sites may be copolymerized cure site monomers or halogen atoms that are present at terminal positions of the fluoroelastomer polymer chain. The cure site monomers, reactive double bonds or halogenated end groups are capable of reacting to form crosslinks, especially under conditions of catalysis or initiation by the action of peroxides.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2$ Br—$R_f$—O—CF=$CF_2$ ($R_f$ is perfluoroalkylene), such as $CF_2$ $BrCF_2$ O—CF=$CF_2$, and fluorovinyl ethers of the class ROCF=CFBr or ROCBr=$CF_2$, where R is a lower alkyl group or fluoroalkyl group, such as $CH_3OCF$=CFBr or $CF_3$ $CH_2$ OCF=CFBr.

Iodinated olefins may also be used as cure site monomers. Suitable iodinated monomers include iodinated olefins of the formula: CHR=CH-Z-$CH_2$CHR—I, wherein R is —H or —$CH_3$; Z is a $C_1$—$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: I($CH_2$ $CF_2$ $CF_2$)$_n$OCF=$CF_2$ and $ICH_2$ $CF_2$ O[CF($CF_3$)$CF_2$ O]$_n$ CF=$CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,2,2-tetrafluoroethylene; 1,1,2,3,3 3-hexafluoro-2-iodo-1-(perfluoro-vinyloxy)propane; 2-iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4-tetrafluorohexane are representative of such agents. Other iodinated chain transfer agents include 1,3-diiodoperfluoropropane; 1,4-diiodoperfluorobutane; 1,6-diiodoperfluoro-hexane; 1,3-diiodo-2-chloroperfluoropropane; 1,2-di(iododifluoromethyl)perfluorocyclobutane;

monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1, 1-difluoroethane and others such as disclosed in U.S. Pat. No. 5,151,492.

Other cure monomers may be used that introduce low levels, preferably less than or equal about 5 mole %, more preferably less than or equal about 3 mole %, of functional groups such as epoxy, carboxylic acid, carboxylic acid halide, carboxylic ester, carboxylate salts, sulfonic acid groups, sulfonic acid alkyl esters, and sulfonic acid salts. Such monomers and cure are described for example in Kamiya et al., U.S. Pat. No. 5,354,811.

Fluorocarbon elastomers based on cure site monomers are commercially available. Non-limiting examples include Viton GF, GLT-305, GLT-505, GBL-200, and GBL-900 grades from DuPont. Others include the G-900 and LT series from Daikin, the FX series and the RE series from NOK, and Tecnoflon P457 and P757 from Solvay.

A wide variety of fluorocarbon elastomers may be crosslinked or cured by a combination of a peroxide curative agent and a crosslinking co-agent. Generally, elastomers are subject to peroxide crosslinking if they contain bonds, either in the side chain or in the main chain, other than carbon fluorine bonds. For example, the peroxide curative agent may react with a carbon hydrogen bond to produce a free radical that can be further crosslinked by reaction with the crosslinking co-agent. In a preferred embodiment, peroxide curable elastomers are those that contain cure site monomers described above. The cure site monomers introduce functional groups such as carbon bromine bonds, carbon iodine bonds, or double bonds, that serve as a site of attack by the peroxide curative agent. The kinetics of the peroxide cure are affected by the presence and nature of any cure site monomers present in the fluorocarbon elastomers. As a rule, the curing of an elastomer containing a cure site monomer is significantly faster than that of elastomers without cure site monomers.

Preferred peroxide curative agents are organic peroxides, for example dialkyl peroxides. In general, an organic peroxide may be selected to function as a curing agent for the composition in the presence of the other ingredients and under the temperatures to be used in the curing operation without causing any harmful amount of curing during mixing or other operations which are to precede the curing operation. A dialkyl peroxide which decomposes at a temperature above 49° C. is especially preferred when the composition is to be subjected to processing at elevated temperatures before it is cured. In many cases one will prefer to use a ditertiarybutyl peroxide having a tertiary carbon atom attached to a peroxy oxygen. Non-limiting examples include 2,5-dimethyl-2,5-di(tert-butylperoxy)-3-hexyne; 2,5-dimethyl-2,5-di(tertbutylperoxy)hexane; and 1,3-bis-(t-butylperoxyisopropyl)benzene. Other non-limiting examples of peroxide curative agent include dicumyl peroxide, dibenzoyl peroxide, tertiary butyl perbenzoate, di[1,3-dimethyl-3-(t-butylperoxy)butyl]carbonate, and the like.

One or more crosslinking co-agents may be combined with the peroxide. Examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri(5-norbomene-2-methylene)cyanurate.

Another group of fluorocarbon elastomers is curable by the action of various polyols. Curing with the polyol crosslinking agents is also referred to as phenol cure because phenols are commonly used polyols for the purpose. Many of the fluorocarbon elastomers that can be cured with polyols can also be cured with peroxides. The curability with either of the curing systems, and the relative rates of cure, depend on conditions during the dynamic vulcanization described below.

Phenol or polyol curative systems for fluorocarbon elastomers contain onium salts and one or more polyol crosslinking agents. In addition, crosslinking by phenol and polyol agents is accelerated by the presence in mixtures of phenol curing accelerators or curing stabilizers. Commonly used curing accelerators include acid acceptor compounds such as oxides and hydroxides of divalent metals. Non-limiting examples include calcium hydroxide, magnesium oxide, calcium oxide, and zinc oxide. In many embodiments, the rate of cure by phenol curing agents is significantly reduced when the acid acceptor compounds are not present in mixtures being dynamically vulcanized. In other words, even though a commercial embodiment may contain a phenol curable elastomer and a phenol and onium curing agent incorporated into the elastomer, the rate of phenol cure will nevertheless be very slow or nonexistent if the mixture contains no added acid acceptor compounds.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

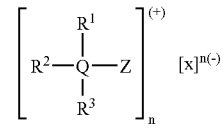

where
Q is nitrogen or phosphorus;
Z is a hydrogen atom or
is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula —$CY_2$ COOR' where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;
$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols include aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the Formula

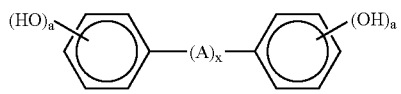

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, a is independently 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol formula III that the —OH groups can be attached in any position (other than number one) in either ring. Blends of two or more such compounds can also be used. A preferred bisphenol compound is Bisphenol AF, which is 2,2-bis(4-hydroxyphenyl) hexafluoropropane. Other non-limiting examples include 4,4'-dihydroxy-diphenyl sulfone (Bisphenol S) and 2,2-bis (4-hydroxyphenyl) propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins. U.S. Pat. Nos. 2,972,600 and 3,287,440 are incorporated herein in this regard. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents may be represented by the general formula

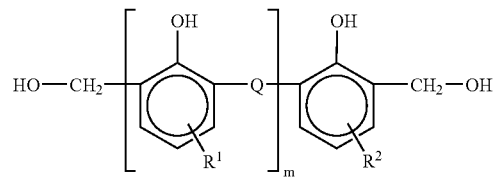

where Q is a divalent radical selected from the group consisting of —$CH_2$— and —$CH_2$—O—$CH_2$—; m is zero or a positive integer from 1 to 20 and R' is hydrogen or an organic radical. Preferably, Q is the divalent radical —$CH_2$—O—$CH_2$—, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425, which is incorporated herein by reference.

In various embodiments, phenol curable fluorocarbon elastomers include those based on copolymers containing vinylidene fluoride. It is believed that the methylene group of the vinylidene fluoride monomer provides a site of attack by the phenol crosslinking agent. Accordingly, curable compositions include vinylidene fluoride polymers. A suitable class of elastomers that reacts very slowly with phenol crosslinking agents is the so-called FFKM elastomers, which are completely fluorinated on the main chain and contain no vinylidene fluoride. Commercially available FKKM elastomers include Unimatic ZF7710 (NOK), Kalrez (DuPont-Dow Elastomers), and PFR 91, PFR 94, and PFR 95 (Solvay Solexis).

The invention involves dynamically vulcanizing or curing a first elastomer in the presence of a thermoplastic material and a second elastomer under conditions where the second elastomer cures slower than the first elastomer. In a preferred embodiment, the rate of cure of the second elastomer is so slow that it is considered non-curing. Typically, the first elastomer is cured under conditions where the second elastomer cures at a very slow rate, or not at all.

Conditions that tend to favor a high rate of cure by peroxide curative agents include the presence of cure site monomers in the elastomer, the presence of peroxide curative agent, and the presence of peroxide crosslinking co-agents. The absence of any of these conditions tends to lower the relative rate of cure by peroxide.

Factors or conditions that favor a high rate of cure by phenol curative agents include the presence of phenol, onium, and acid acceptors in the composition, and the presence in the elastomer structure of repeating units corresponding to vinylidene fluoride monomers. In addition, the rate of phenol based cure of fluorocarbon elastomers can be increased by providing the curative agents in a pre-incorporated fashion, such as is available commercially from a number of suppliers. In a preferred embodiment, curative agents are provided in an especially advantageous dispersion in the elastomer. A commercial embodiment is given in the Tecnoflon FOR 50HS and FOR 80HS series available from Solvay. In general, the more finely dispersed the curative agents in the elastomer composition, the faster the kinetics of cure by the phenol curative agents.

Taking into account factors such as those noted above, and others that are well known to those skilled in the art, conditions of dynamic vulcanization are chosen that favor the cure of the first elastomer over the cure of the second elastomer. Because the first elastomer cures to a greater degree under the conditions selected than does the second elastomer, the first elastomer is referred to as "curable" while the second elastomer is called "uncurable". It is to be understood that under many conditions the second elastomer is cured or crosslinked during dynamic cure of the first elastomer, the cured second elastomer will be present as particles dispersed in the thermoplastic matrix along with particles of the cured first elastomer. In those cases, the uncured portion of the second elastomer remains available as a processing aid. In preferred embodiments, the processable compositions and shaped articles of the invention, the uncured portion of the second elastomer makes up from 1 to about 20 parts, preferably from about 1 to about 10 parts based on 100 parts of the cured first elastomer. As a result, the second elastomer remains uncured or only partially cured after the dynamic curing step. The uncured second elastomer is then available to act as processing aid, plasticizer, or other additive in further thermoplastic processing of the compositions prepared by dynamic vulcanization. Non-limiting examples of such conditions are given in the Examples below.

In one aspect, compositions and shaped articles are made by dynamic vulcanization under conditions where a first (curable) elastomer is completely cured while a second (uncurable) elastomer is less than completely cured, with the uncured portion of the second elastomer being present in the compositions as a processing aid. Suitable second elastomers include those that cure at lower rates than the first elastomer under conditions of dynamic cure. Preferably the rate of cure of the first elastomer is at least twice the rate of the second elastomer, more preferably at least 10 or at least 100 times. Rates of cure of the elastomers under the conditions can be determined using standard kinetic measurements known to those of skill in the art.

The relative rates of cure of the first and second elastomers under the conditions of dynamic vulcanization and the time of reaction determines the extent to which the respective elastomers are cured during the process. In various embodiments, the dynamic vulcanization process is carried out for a time that is greater than t90 for the first elastomer and less than t90 for second elastomer. Preferably t is less than t50 and more preferably is less than t10 of the second elastomer. The parameters t10, t50, and t90 are determined in a standard test, and represent the times at which 10%, 50%, and 90%, respectively of the final mixing torque is achieved during cure. The development of mixing torque is a measure of the extent of cure during the reaction. The times are measured on industry standard equipment such as the RPA 2000 rubber processing analyzer, the Monsanto diskless rheometer, and the oscillatory disk rheometer. The absolute values of the cure times are somewhat machine dependent. For purposes of the invention, cure times of the first and second elastomers should be evaluated on the same machine.

In various embodiments, under some conditions the second elastomer essentially does not cure under the dynamic vulcanization conditions. In these cases, it is understood that parameters such as t10, t50, and t90 are either undefined or very difficult to measure. A non-limiting example is where the first elastomer is a peroxide curable fluorocarbon containing cure site monomers and the second elastomer is a fluorocarbon polymer containing no cure site monomers. Another is where the first elastomer is phenol curable and the second elastomer is an FFKM elastomer containing no sites that react with phenol. Another is where the curable resin cures by a peroxide mechanism and the uncurable resin is a phenol curable resin (no cure site monomers) with incorporated phenol crosslinker. In a composition containing no acid acceptors, the phenol curable resin will not appreciably cure, even though a crosslinking agent is incorporated.

In one embodiment, the curable fluorocarbon elastomer is a phenol curable resin with highly dispersed curative agents present in the composition. The mixture being dynamically cured also includes an acid acceptor such as magnesium oxide as an accelerator. An uncurable elastomer is provided comprising a peroxide curable elastomer containing cure site monomers. However, if no peroxide crosslinking agent is provided in the mixture being dynamically cured, the peroxide curable elastomer will be subject to cure, if at all, only by the phenol curative agents present in the mixture. As the phenol curable elastomer composition contains finely dispersed crosslinking agents as discussed above, its kinetics of cure will be faster than for the peroxide curable elastomer.

In another exemplary embodiment, the curable or first elastomer comprises a peroxide curable elastomer containing cure site monomers. The mixture further contains an organic peroxide and a crosslinking co-agent such as triallylisocyanurate. The uncurable elastomer consists of a phenol curable elastomer with finely dispersed curing agents, but the mixture contains no acid acceptor. As a result, during dynamic vulcanization, the rate of cure of the peroxide curable elastomer will be greater than the rate of cure of the phenol curable elastomer.

In another embodiment, the curable elastomer comprises a cure incorporated phenol curable resin, along with acid acceptors such as calcium hydroxide or magnesium oxide. The uncurable elastomer is a peroxide curable elastomer terpolymer. Because the mixture contains no peroxide, the peroxide curable elastomer will cure, if at all, only by reaction with phenol crosslinking agents present in the mixture. However, in this embodiment, the rate of phenol cure of the peroxide curable elastomer will be less than the rate of cure of the phenol curable elastomer of the phenol curable first elastomer. This is because the crosslinking agents are finally dispersed into the first elastomer, causing the rate of cure to be higher.

In another embodiment, the curable elastomer is a peroxide curable elastomer containing cure site monomers, and the mixture further comprises peroxides and crosslinking co-agents. The uncurable elastomer is a peroxide curable composition containing no cure site monomers. As a result, the rate of cure of the uncurable elastomer will be significantly lower than that of the curable elastomer.

Alternatively, the uncurable elastomer can be a phenol curable elastomer, but the mixture contains no phenol crosslinker. Alternatively, the mixture contains no acid accelerator. In yet another embodiment, the mixture contains neither a phenol crosslinker, an onium compound, or an acid acceptor. In all cases, the nominally phenol curable elastomer will cure, if at all, only under a peroxide curing scheme. As noted above, the peroxide curable elastomer containing cure site monomers will cure faster than any of the phenol curable elastomers noted above.

In yet another embodiment, the curable elastomers are selected from cure incorporated phenol curable elastomer compositions containing in addition an acid accelerator in the mixture. Such elastomers will cure at a fairly high rate. In these situations, the uncurable elastomer can be selected from among elastomeric compositions that cure significantly slower under the same conditions. In one embodiment, peroxide curable elastomers that do not contain the phenol curing agent incorporated will cure at a slower rate. In other embodiments, FFKM elastomers containing no vinylidene fluoride repeating units will react slower with phenol crosslinking agents than the curable resins. In still other embodiments, an uncurable resin can be selected from phenol curable elastomers having curing agents incorporated, but incorporated not as finally as those in the curable elastomer. As a result, the curable elastomer will cure faster than the uncurable elastomer.

In yet another embodiment, a relatively faster phenol curing elastomer may be provided as the curable elastomer, while a slower curing component is used as the uncurable elastomer. For example, as a rule dipolymer phenol curable elastomers cure faster under the same conditions than a corresponding terpolymer phenol curable elastomer.

By using elastomers and conditions such as those discussed above, conditions and compositions may be selected leading to thermoprocessable compositions of the invention.

The continuous phase of the shaped articles and processable compositions of the invention is made of a thermoplastic polymeric material. The thermoplastic polymers and the dynamic vulcanizates containing them are melt processable—they soften and flow when heated. The vulcanizates can be readily processed in thermoplastic techniques such as injection molding, extrusion, compression molding, and blow molding. The materials are readily recyclable by melting and re-processing.

In a preferred embodiment, the thermoplastic polymer is a fluorocarbon thermoplastic polymer, also referred to as a "fluoroplastic". Commercial embodiments are available that contain 59 to 76% by weight fluorine. They may either be fully fluorinated or partially fluorinated. In various other preferred embodiments, the thermoplastic is selected from thermoplastic elastomers, high molecular weight plastic materials, and other thermoplastic polymeric materials that do not contain fluorine. Mixtures of fluoroplastics and non-fluoroplastics may also be used.

Fully fluorinated thermoplastic polymers include copolymers of tetrafluoroethylene and perfluoroalkyl vinyl ethers. The perfluoroalkyl group is preferably of 1 to 6 carbon atoms. Examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoro olefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene. Thermoplastic terpolymers may also be used. These include thermoplastic terpolymers of TFE, HFP, and vinylidene fluoride. Fully fluorinated fluoroplastics are characterized by relatively high melting points, when compared to the vinylidene fluoride based thermoplastics that are also included in the fluoroplastic blend of the invention. As examples, PFA has a melting point of about 305° C., MFA has a melting point of 280-290° C., and FEP has a melting point of about 260-290° C. The melting point of individual grades depends on the exact structure, processing conditions, and other factors, but the values given here are representative.

Partially fluorinated fluoroplastics such as the vinylidene fluoride homo- and copolymers described above have relatively lower melting points than the fully fluorinated fluoroplastics. For example, polyvinylidene fluoride has a melting point of about 160-170° C. Some copolymer thermoplastics have an even lower melting point, due to the presence of a small amount of co-monomer. For example, a vinylidene fluoride copolymer with a small amount of hexafluoropropylene, exemplified in a commercial embodiment such as the Kynar Flex series, exhibits a melting point in the range of about 105-160° C., and typically about 130° C. These low melting points lead to advantages in thermoplastic processing, as lower temperatures of melting lead to lower energy costs and avoidance of the problem of degradation of cured elastomers in the compositions.

In various embodiments, the thermoplastic material of the invention provide enhanced properties of the rubber/thermoplastic combination at elevated temperatures, preferably above 100° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured fluorocarbon elastomer (rubber) at a comparable temperature.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by $(A-B)_n$, where A represents the hard segments and B the soft segments as described above.

Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a preferred embodiment, a thermoplastic elastomer is used that has alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. Preferably, the materials are crystalline or semicrystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature or glass transition temperature in the range from about 80° C. to about 350° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and the fluorine-containing thermoplastics described above.

Polyolefins are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

The processable rubber compositions of the invention are prepared by a process of dynamic vulcanization such as disclosed in Gessler et al, U.S. Pat. No. 3,037,954 (Jun. 5, 1962), the disclosure of which is hereby incorporated by reference in its entirety. Dynamic vulcanization—or dynamic cure—is a vulcanization or a curing process for a rubber (here a fluorocarbon elastomer) contained in a thermoplastic composition. The curable rubber is vulcanized in the presence of the thermoplastic compositions under conditions of sufficiently high shear at a temperature above the melting point of the thermoplastic component. The curable rubber is simultaneously crosslinked and dispersed within the thermoplastic matrix while the uncurable rubber remains uncured or less than fully cured.

Dynamic vulcanization is carried out by applying mechanical energy to mix the elastomeric and thermoplastic components at elevated temperature in the presence of a curative. The term "applying mechanical energy" refers to mixing, agitating, kneading, masticating, and similar operations carried out in conventional mixing equipment, such as roll mills, Moriyama mixers, Banbury mixers, Brabender mixers, continuous mixers, mixing extruders such as single and twin-screw extruders, and the like. At the same time, thermal energy is applied to heat the thermoplastic to a melt flowable temperature and to cure the curable elastomer component. As noted above, the curative and the vulcanization conditions are selected so that the first (curable) elastomer cures at a faster rate than the second (uncurable) elastomer. An advantageous characteristic of dynamically cured compositions is that, notwithstanding that the elastomeric component is fully cured, the compositions can be processed and reprocessed by conventional plastic processing techniques such as extrusion, injection molding, and compression molding. Scrap or flashing can also be salvaged and reprocessed with thermoplastic techniques.

The vulcanized elastomeric material that results from the process of dynamic vulcanization is generally present as small particles within a continuous thermoplastic polymer matrix. A co-continuous morphology is also possible depending on the amount of elastomeric material relative to thermoplastic material, the cure system, the mechanism of cure and the amount and degree of mixing. It is believed the unvulcanized material (of the second elastomer) is present at least in part in the continuous thermoplastic phase of the dynamic vulcanizate, where it provides plasticizing and lubricating properties during subsequent plastic processing.

After dynamic vulcanization, a homogeneous mixture is obtained wherein the cured fluoroelastomer is in the form of dispersed particles having an average particle smaller than about 50 micrometers, preferably of an average particle size smaller than about 25 micrometers. The particle size may be determined from maps prepared by atomic force microscopy on cryogenically microtomed cross-sections of shaped articles formed from the processable rubber composition.

Typically, the particles have an average size of 10 micrometers or less, more preferably 5 micrometers or less as measured with the atomic force microscopy technique. In some embodiments, the particles have an average size of 1 micrometer or less. In other embodiments, even when the average particle size is higher, there will be a significant number of cured elastomer particles with a diameter of less than 1 micron dispersed in the thermoplastic matrix.

In addition to the first and second elastomeric materials (the "curable" and "uncurable" elastomers described above), the thermoplastic polymeric material, and curative, the processable rubber compositions of this invention optionally include other additives such as stabilizers, conventional processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of conventional processing aids may be used in addition to the uncured second elastomer compositions of the invention, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$-$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers, especially for fluorocarbons that are curable with polyols or phenols. Preferred acid acceptor compounds include oxides and hydroxides of divalent metals. Non-limiting examples include $Ca(OH)_2$, MgO, CaO, and ZnO.

Non-limiting examples of fillers include both organic and inorganic fillers such as barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar). Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In various embodiments, fillers such as carbon black make up to about 40% by weight of the total weight of the compositions of the invention. Preferably, the compositions comprise 1-40 weight % of filler. In other embodiments, the filler makes up 10 to 25 weight % of the compositions.

Heating and mixing or mastication at vulcanization temperatures are generally adequate to complete the vulcanization of the first elastomer in a few minutes or less, but if shorter vulcanization times are desired, higher temperatures and/or higher shear may be used. A suitable range of vulcanization temperature is from about the melting temperature of the thermoplastic material, which is up to about 300° C. or more. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained. In various embodiments, the cured first elastomer is in the form of small dispersed particles essentially of an average particle size smaller than about 50 µm, preferably of an average particle size smaller than about 25 µm. More typically and preferably, the particles have an average size of about 10 µm or less, preferably about 5 µm or less, and more preferably about 1 µm or less. In other embodiments, even when the average particle size is larger, there will be a significant number of cured elastomer particles less than 1 µm in size dispersed in the thermoplastic matrix.

The size of the particles referred to above may be equated to the diameter of spherical particles, or to the diameter of a sphere of equivalent volume. It is to be understood that not all particles need be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. In certain embodiments, additional ingredients are added after the dynamic vulcanization is complete. For example, a stabilizer package may be added to the thermoplastic vulcanizate after vulcanization has been essentially completed, i.e., the curative has been essentially consumed.

The processable rubber compositions of the invention may be manufactured in a batch process or a continuous process. In a batch process, predetermined charges of elastomeric materials, thermoplastic polymeric material, and curative agents are added to a mixing apparatus. In an exemplary batch procedure, the elastomeric materials and thermoplastic materials are first mixed, blended, masticated or otherwise physically combined until a desired particle size of elastomeric material is provided in a continuous phase of thermoplastic material. When the structure of the elastomeric material is as desired, a curative agent may be added while continuing to apply mechanical energy to mix the elastomeric material and thermoplastic materials. Curing is effected by heating or continuing to heat the mixing combination of thermoplastic material and elastomeric material in the presence of the curative agent. When cure is complete, the processable rubber composition may be removed from the reaction vessel (mixing chamber) for further processing.

Alternatively, the first elastomer is provided commercially with a curing agent incorporated. Such commercial materials are especially well known among phenol curable fluorocarbon elastomers. In various embodiments, phenol crosslinking agents and optionally onium compounds are pre-compounded into the fluorocarbon elastomer. In these embodiments, the timing of cure can be varied and adjusted according to when curing accelerators such as MgO, $Ca(OH)_2$ and the like are added. Peroxide-curable fluorocarbon elastomer compositions are less frequently provided as cure-incorporated commercial products. More commonly, suitable peroxide curative agents and olefin functional crosslinking co-agents are added during the batch or continuous process to effect cure at a desired rate and time.

It is preferred to mix the elastomeric and thermoplastic materials at a temperature where the thermoplastic material softens and flows. If such a temperature is below that at which the curative agent is activated, the curative agent may be a part of the mixture during the initial particle dispersion step of the batch process. In some embodiments, a curative is combined with the elastomeric and fluoroplastic materials at a temperature below the curing temperature. When the desired dispersion is achieved, the temperature may be increased to effect cure. Alternatively or in addition, a component needed for rapid cure, such as the acid acceptor accelerators or crosslinking co-agents are added to the mixture strategically to control the onset of cure during the process.

In one embodiment, commercially available elastomeric materials are used that contain a curative pre-formulated into the elastomer. However, if the curative agent is activated at the temperature of initial mixing, it is preferred to leave out the curative until the desired particle size distribution of the elastomeric material in the thermoplastic matrix is achieved. In another embodiment, curative is added after the elastomeric material and fluoroplastic blend are mixed. In a preferred embodiment, the curative agent is added to a mixture of elastomeric and thermoplastic materials while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, the thermoplastic and elastomeric materials are combined by inserting them into the screw extruder together from a first hopper using a feeder (loss-in-weight or volumetric feeder). Temperature and screw parameters may be adjusted to provide a proper temperature and shear to effect the desired mixing and particle size distribution of an uncured elastomeric component in a thermoplastic material matrix. The duration of mixing may be controlled by providing a longer or shorter length of extrusion apparatus or by controlling the speed of screw rotation for the mixture of elastomeric materials and thermoplastic material to go through during the mixing phase. The degree of mixing may also be controlled by the mixing screw element configuration in the screw shaft, such as intensive, medium or mild screw designs. Then, in a non-limiting example at a downstream port, by using side feeder (loss-in-weight or volumetric feeder), a curative agent, curing accelerator, or similar material may be added continuously to the mixture of thermoplastic and elastomeric materials as it continues to travel down the twin screw extrusion pathway. Downstream of the curative additive port, the mixing parameters and transit time may be varied as described above. After extrusion from the mixing apparatus, the dynamically vulcanized strand may be cooled in a water bath and chopped into pellets for later use.

By adjusting the shear rate, temperature, duration of mixing, mixing screw element configuration, as well as the time of adding curative agents, cure accelerators, and the like, processable rubber compositions of the invention may be made in a continuous process. As in the batch process, the curable elastomeric material may be commercially formulated to contain a curative agent, generally a phenol or phenol resin curative.

In various embodiments, the compositions and articles of the invention contain a sufficient amount of vulcanized elastomeric material ("rubber") to form a rubbery composition of matter, that is, they will exhibit a desirable combination of flexibility, softness, and compression set. Preferably, the compositions comprise at least about 25 parts by weight rubber, preferably at least about 35 parts by weight rubber, more preferably at least about 40 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 95 percent by weight, more preferably from about 40 to about 90 weight percent, and more preferably from about 50 to about 80 percent by weight of the total weight of the rubber and the thermoplastic polymer combined.

The amount of thermoplastic material within the processable rubber compositions of the invention is generally from about 5 to about 95 percent by weight, preferably from about 10 to about 65 percent by weight and more preferably from about 20 to about 50 percent by weight of the total weight of the rubber and the fluoroplastic blend combined. The uncured elastomer is present in the processable rubber compositions at a level of 1 to 20 parts, preferably 1 to 10 parts per 100 parts of cured elastomer. Advantageously, the shaped articles of the invention are rubber-like materials that, unlike conventional rubbers, can be processed and recycled like thermoplastic materials. These materials are preferably rubber-like to the extent that they will retract to less than 1.5 times their original length within one minute after being stretched at room temperature to twice its original length and held for one minute before release, as defined in ASTM D1566. Also, these materials preferably satisfy the tensile set requirements set forth in ASTM D412, and they also satisfy the elastic requirements for compression set per ASTM D395.

EXAMPLES

Examples 1-6 illustrate recipes for making moldable compositions of the invention. They can be made by either batch or continuous processes.

In a batch process, processable rubber compositions are compounded in a batch mixer such as a Banbury mixer, Moriyama mixer, or a Brabender with an internal mixing attachment. The components are charged to the mixer and blended at a temperature of about 130° C. for 10-15 minutes at 50 rpm rotor speed. Phenol-cured compositions are then heated to about 190° C. (Examples 1, 3, 5); peroxide cured compositions are heated to 150° C. (Examples 2, 4, 6). If the elastomers are not cure incorporated, curing agent may also be added at this time. Stirring continues for an additional time required to achieve full cure of the first (curable) elastomer, as determined for example by reaching a steady state torque reading in the mixer. In Examples 1-6, the additional times ranges from about 3 to about 10 minutes. The composition is then discharged from the batch mixer and granulated to make small size pellets for use in subsequent fabrication processes, such as injection molding, compression molding, blow molding, single layer extrusion, multi-layer extrusion, insert molding, and the like.

A continuous process is carried out in a twin-screw extruder. Components are blended in a mixing zone at 130° C. for 3-10 minutes, then cured in a reaction zone at 190° C. or 150° C. as above, until complete cure of the first elastomer is achieved. The cured elastomer/fluoroplastic blend is extruded through a 1-3 mm diameter strand die and is quenched by cooling in a water bath before passing through a strand pelletizer. The pellets may be processed by a wide variety of thermoplastic techniques into molded articles. The material may also be formed into plaques for the measurement of physical properties.

In Examples 1-6, the following materials are used:

Tecnoflon FOR 50HS and FOR 80HS are no (low) post cure bisphenol curable fluorocarbon elastomers from Solvay, with bisphenol curing agent formulated into the resin.

Kynar Flex 2500-20 is a vinylidene fluoride/HFP copolymer based thermoplastic from Atofina Chemicals.

Elastomag 170 is a magnesium hydroxide powder from Rohm and Haas.

MT N-990 is a carbon black filler.

Struktol WS-280 is a processing aid from Struktol.

Tecnoflon FPA-1 is a high temperature processing aid from Solvay.

Fluorel FE 5840 is a high fluorine (70% F) cure incorporated fluoroelastomer from Dyneon.

Dyneon BRE 7231X is a base resistant cure incorporated fluoroelastomer from Dyneon. It is based on a terpolymer of TFE, propylene, and vinylidene fluoride.

PFA is a copolymer of TFE and perfluoropropyl vinyl ether.

Rhenofit CF is a calcium hydroxide from Rhein Chemie.

Austin Black is a carbon black filler.

Hylar MP-10 is a polyvinylidene fluoride fluoroplastic from Ausimont.

Tecnoflon P757 is a medium viscosity peroxide curable fluoroelastomer from Solvay (67% F).

Tecnoflon P457 is a low viscosity peroxide curable fluoroelastomer, with 67% F, from Solvay.

TAIC, 75% is a 75% solution of triallylisocyanurate.

ZnO is zinc oxide.

Luperco 101XL is a peroxide curative agent from Atochem, the active ingredient of which is 2,5-dimethyl-2,5-di-(t-butylperoxy)hexane.

Example 1

In Example 1, the curable elastomer is Tecnoflon FOR 50HS, which contains a cure incorporated phenol crosslinker as well as cure accelerators. The uncurable elastomer is Tecnoflon P457, which is a peroxide curable elastomer. Since the composition of Example 1 contains no peroxide curative agent, the uncurable elastomer cures at a much lower rate than the Tecnoflon FOR 50HS.

| Ingredient | Ex 1a phr | Ex 1b phr | Ex 1c phr | Ex 1d phr | Ex 1e phr |
|---|---|---|---|---|---|
| Tecnoflon FOR 50HS | 100.0 | 100.0 | 100.0 | 100.0 | 100.0 |
| Solvay Hylar MP-10 | 25.0 | 50.0 | 100.0 | 150.0 | 200.0 |
| Elastomag 170 (MgO) | 3.0 | 3.0 | 3.0 | 3.0 | 3.0 |
| MT Black (N990) | 10.00 | 10.00 | 10.00 | 10.00 | 10.00 |
| Struktol WS-280 | 1.0 | 1.0 | 1.0 | 1.0 | 1.0 |
| Tecnoflon FPA-1 | 1.0 | 1.0 | 1.0 | 1.0 | 1.0 |
| Tecnoflon P457 | 5.00 | 5.00 | 5.00 | 5.00 | 5.00 |

Example 2

In Example 2, the curable elastomer is Tecnoflon P457, which is a peroxide curable elastomer. The uncurable elastomer in Example 2 is Tecnoflon FOR 50HS. The cure is carried out at 150° C. Under the conditions of the dynamic vulcanization, the Tecnoflon P457 elastomer is cured by the peroxide (Luperco 101 XL) and crosslinking co-agents (TAIC). At the vulcanization temperature (150° C.) the cure rate of Tecnoflon FOR 50HS is lower than that of the Tecnoflon P457, even though the Tecnoflon material contains a phenol curing agent.

| Ingredient | Ex 1a phr | Ex 1b phr | Ex 1c phr | Ex 1d phr | Ex 1e phr |
|---|---|---|---|---|---|
| Tecnoflon P457 | 100.0 | 100.0 | 100.0 | 100.0 | 100.0 |
| Kynar Flex 2500-20 | 25.0 | 50.0 | 100.0 | 150.0 | 200.0 |
| Luperco 101 XL | 3.0 | 3.0 | 3.0 | 3.0 | 3.0 |
| TAIC, 75% Dispersion | 4.00 | 4.00 | 4.00 | 4.00 | 4.00 |
| ZnO | 5.00 | 5.00 | 5.00 | 5.00 | 5.00 |
| MT N-990 Carbon Black | 10.00 | 10.00 | 10.00 | 10.00 | 10.00 |
| Technoflon FOR 50HS | 5.00 | 5.00 | 5.00 | 5.00 | 5.00 |

Example 3

In Example 3, the curable elastomer is a phenol incorporated material (Tecnoflon FOR 80HS) and the uncurable elastomer is a peroxide curable elastomer (Tecnoflon P757). The Tecnoflon P757 cures at a lower rate than the Tecnoflon FOR 80HS because the curing composition contains no peroxide.

| Ingredient | Ex 1a phr | Ex 1b phr | Ex 1c phr | Ex 1d phr | Ex 1e phr |
|---|---|---|---|---|---|
| Tecnoflon FOR 80HS | 100.0 | 100.0 | 100.0 | 100.0 | 100.0 |
| Solvay Hylar MP-10 | 25.0 | 50.0 | 100.0 | 150.0 | 200.0 |
| Elastomag 170 (MgO) | 3.0 | 3.0 | 3.0 | 3.0 | 3.0 |
| MT Black (N990) | 10.00 | 10.00 | 10.00 | 10.00 | 10.00 |
| Struktol WS-280 | 1.00 | 1.00 | 1.00 | 1.00 | 1.00 |
| Tecnoflon FPA-1 | 1.00 | 1.00 | 1.00 | 1.00 | 1.00 |
| Tecnoflon P757 | 5.00 | 5.00 | 5.00 | 5.00 | 5.00 |

Example 4

In Example 4, the curable elastomer is Tecnoflon P757, which cures by the action of the Luperco 101 XL and TAIC. The uncurable elastomer Tecnoflon FOR 80HS cures at a lower rate because the curing is carried out at a temperature of 150° C.

| Ingredient | Ex 1a phr | Ex 1b phr | Ex 1c phr | Ex 1d phr | Ex 1e phr |
|---|---|---|---|---|---|
| Tecnoflon P757 | 100.0 | 100.0 | 100.0 | 100.0 | 100.0 |
| Kynar Flex 2500-20 | 25.0 | 50.0 | 100.0 | 150.0 | 200.0 |
| Luperco 101XL | 3.0 | 3.0 | 3.0 | 3.0 | 3.0 |
| TAIC, 75% Dispersion | 4.00 | 4.00 | 4.00 | 4.00 | 4.00 |
| ZnO | 5.00 | 5.00 | 5.00 | 5.00 | 5.00 |
| MT N-990 Carbon Black | 10.00 | 10.00 | 10.00 | 10.00 | 10.00 |
| Tecnoflon FOR 80HS | 5.00 | 5.00 | 5.00 | 5.00 | 5.00 |

Example 5

In Example 5, the curable elastomers are phenol curing agent incorporated elastomers (Dyneon FE5840 and Dyneon BRE7321X). Cure of the elastomers is accelerated by the presence of acid acceptors Rhenofit CF and Elastomag 170. The vulcanization is carried out at a temperature of 190C. Under these conditions, the cure of the Dyneon materials is faster than cure of the Tecnoflon P457. As noted above, the P457 material is peroxide curable and contains cure site monomers. Nevertheless, under the conditions of dynamic vulcanization where a peroxide curative agent is missing, the phenol curable elastomer cures faster.

| Ingredient | Ex 1a phr | Ex 1b phr | Ex 1c phr | Ex 1d phr | Ex 1e phr |
|---|---|---|---|---|---|
| Dyneon FE5840 | 70.0 | 70.0 | 70.0 | 70.0 | 70.0 |
| Dyneon BRE 7232X | 30.0 | 30.0 | 30.0 | 30.0 | 30.0 |
| Hylar MP-10 | 25.0 | 50.0 | 100.0 | 150.0 | 200.0 |
| Rhenofit CF | 6.0 | 6.0 | 6.0 | 6.0 | 6.0 |
| Elastomag 170 | 3.0 | 3.0 | 3.0 | 3.0 | 3.0 |
| Struktol WS-280 | 1.0 | 1.0 | 1.0 | 1.0 | 1.0 |
| Austin Black | 10.00 | 10.00 | 10.00 | 10.00 | 10.00 |
| Tecnoflon P457 | 5.00 | 5.00 | 5.00 | 5.00 | 5.00 |

Example 6

In Example 6, the curable elastomer is composition is the Tecnoflon P457 elastomer together with Luperco 101XL and TAIC. Together the three components form a curable elastomer composition with a high rate of cure at the vulcanization temperature of 150° C. The uncurable elastomer is a combination of the Dyneon materials of Example 5. Although the Dyneon materials contain a curative agent (phenol) incorporated, the cure at 150° C. is slower than that of the cure site incorporated peroxide curable elastomer.

| Ingredient | Ex 1a phr | Ex 1b phr | Ex 1c phr | Ex 1d phr | Ex 1e phr |
|---|---|---|---|---|---|
| Tecnoflon P457 | 100.0 | 100.0 | 100.0 | 100.0 | 100.0 |
| Kynar Flex 2500-20 | 25.0 | 50.0 | 100.0 | 150.0 | 200.0 |
| Luperco 101XL | 3.0 | 3.0 | 3.0 | 3.0 | 3.0 |
| TAIC, 75% Dispersion | 4.00 | 4.00 | 4.00 | 4.00 | 4.00 |
| ZnO | 5.00 | 5.00 | 5.00 | 5.00 | 5.00 |
| MT N-990 Carbon Black | 10.00 | 10.00 | 10.00 | 10.00 | 10.00 |
| Dyneon FE 5840 | 3.50 | 3.50 | 3.50 | 3.50 | 3.50 |
| Dyneon BRE 7231x | 1.00 | 1.00 | 1.00 | 1.00 | 1.00 |

Although the invention has been described in light of various embodiments including those currently considered to be the most advantageous or preferred for carrying out the invention, it is to be understood that the invention is not limited to the disclosed embodiments. Rather, variations and modifications that will occur to one of skill in the art upon reading the disclosure are intended to be within the scope of the invention, which is defined in the appended claims.

What is claimed is:

1. A processable rubber composition comprising:
   a continuous phase of a thermoplastic polymeric material;
   a first fluorocarbon elastomer in the form of cured particles dispersed in the continuous phase; and
   a second fluorocarbon elastomer comprising an uncured fluorocarbon elastomer at a level of 10 parts or less per 100 parts of the first fluorocarbon elastomer.

2. A composition according to claim 1, wherein the thermoplastic material comprises a fluoroplastic.

3. A composition according to claim 1, wherein the cured fluorocarbon elastomer is present at 35% or more of the total weight of the cured fluorocarbon elastomer and thermoplastic material.

4. A composition according to claim 1, wherein the cured fluorocarbon elastomer is present at 50% or more of the total weight of the cured fluorocarbon elastomer and thermoplastic material.

5. A composition according to claim 1, wherein the cured fluorocarbon elastomer comprises one or more fluorocarbon polymers selected from the group consisting of VDF/HFP, VDF/HFP/TFE, VDF/PFVE/TFE, TFE/Pr, TFE/Pr/VDF, TFE/Et/PFVE/VDF, TFE/Et/PFVE, TFE/PFVE, and the above polymers further comprising cure site monomers.

6. A composition according to claim 1, wherein the cured fluorocarbon elastomer comprises a peroxide cured elastomer.

7. A composition according to claim 1, wherein the cured fluorocarbon elastomer comprises a polyol cured elastomer.

8. A composition according to claim 1, wherein the cured fluorocarbon elastomer comprises a fluorosilicone rubber.

9. A shaped article made by thermoplastic processing of a composition according to claim 1.

10. An article according to claim 9, wherein the thermoplastic polymeric material comprises a fluoroplastic.

11. An article according to claim 9, wherein the curable fluorocarbon elastomer comprises a fluorosilicone rubber.

12. An article according to claim 9, wherein the cured fluorocarbon elastomer comprises a peroxide cured fluorocarbon polymer rubber.

13. An article according to claim 9, wherein the cured fluorocarbon elastomer comprises a phenol cured fluorocarbon polymer rubber.

14. An article according to claim 9, wherein the cured fluorocarbon elastomer is present at 35% or more of the total weight of the cured fluorocarbon elastomer and thermoplastic material.

15. An article according to claim 9, wherein the cured fluorocarbon elastomer is present at 50% or more of the total weight of the cured fluorocarbon elastomer and thermoplastic material.

16. An article according to claim 9, wherein the cured fluorocarbon elastomer is present at 50% to 80% of the total weight of the cured fluorocarbon elastomer and thermoplastic material.

17. An article according to claim 9, wherein the cured fluorocarbon elastomer comprises one or more fluorocarbon polymers selected from the group consisting of VDF/HFP, VDF/HFP/TFE, VDF/PFVE/TFE, TFE/Pr, TFE/Pr/VDF, TFE/Et/PFVE/VDF, TFE/Et/PFVE, TFE/PFVE, and the above polymers further comprising cure site monomers.

18. An article according to claim 9, wherein the particles of cured fluorocarbon elastomer have an average diameter less than 1 μm.

19. An article according to claim 9, wherein the uncured fluorocarbon elastomer is present at a level of 1 part to 10 parts of the cured fluorocarbon elastomer.

20. An article according to claim 9, wherein the article is a gasket.

21. An article according to claim 9, wherein the article is a seal.

22. An article according to claim 9, wherein the article is a hose.

23. An article according to claim 9, wherein the thermoplastic polymeric material comprises a polyamide.

24. An article according to claim 9, wherein the thermoplastic polymeric material comprises an aromatic polyamide.

25. An article according to claim 9, wherein the thermoplastic polymeric material comprises blocks of polyether and polyamide.

26. An article according to claim 9, wherein the thermoplastic polymeric material is a fully fluorinated fluoroplastic.

* * * * *